US012600632B2

(12) United States Patent
Wang et al.

(10) Patent No.: US 12,600,632 B2
(45) Date of Patent: Apr. 14, 2026

(54) LAYER-NUMBER-CONTROLLABLE GRAPHENE DERIVED FROM NATURAL BIOMASS AND PREPARATION METHOD THEREOF

(71) Applicant: ZJU-HANGZHOU GLOBAL SCIENTIFIC AND TECHNOLOGICAL INNOVATION CENTER, Hangzhou (CN)

(72) Inventors: Duanchao Wang, Hangzhou (CN); Qinghui Guo, Hangzhou (CN)

(73) Assignee: HANGZHOU ATOMIC CARBON MATERIALS CO,. LTD., Hangzhou (CN)

( * ) Notice: Subject to any disclaimer, the term of this patent is extended or adjusted under 35 U.S.C. 154(b) by 549 days.

(21) Appl. No.: 18/138,020

(22) Filed: Apr. 21, 2023

(65) Prior Publication Data

US 2023/0357015 A1     Nov. 9, 2023

(30) Foreign Application Priority Data

May 7, 2022     (CN) .......................... 202210494990.3

(51) Int. Cl.
    C01B 32/184          (2017.01)
    B82Y 30/00          (2011.01)
            (Continued)
(52) U.S. Cl.
    CPC .......... C01B 32/184 (2017.08); C01B 32/196 (2017.08); *B82Y 30/00* (2013.01);
            (Continued)
(58) Field of Classification Search
    CPC . C01B 32/184; C01B 32/196; C01B 2204/04; C01B 2204/32; C01B 32/194;
            (Continued)

(56) References Cited

FOREIGN PATENT DOCUMENTS

CN          11273343  A  *  4/2021  ........... C01B 32/184

OTHER PUBLICATIONS

Machine Translation of CN 11273343 A to Liu, et al. (Year: 2021).*

(Continued)

*Primary Examiner* — Daniel C. McCracken

(74) *Attorney, Agent, or Firm* — Jiwen Chen; Joywin IP Law PLLC

(57)          ABSTRACT

The present invention discloses a layer-number-controllable graphene derived from natural biomass and a preparation method thereof. The preparation method includes pulverizing 1-100 g of biomass to obtain a 50-to 300-mesh biomass scrap, and drying the biomass scrap at 60-100° C. to obtain a biomass precursor; mixing the biomass precursor with a Bronsted acid solution in a solid-liquid ratio of 0.1:10 to 2:100 g/mL, conducting sealing after discharging oxygen and introducing nitrogen, and then conducting heating for a reaction at 75-95° C. for 1-6 hours to obtain a graphene suspension; and conducting post-treatment on the graphene suspension to obtain a stable graphene dispersion, and then drying the stable graphene dispersion to obtain a graphene powder, where the post-treatment includes one or more of filtration washing, dialysis or ultrasonic treatment. According to the preparation method, the layer-number-controllable graphene is prepared by a mild chemical strategy at relatively low temperature with the biomass having high selectivity as a carbon source. The present invention further provides a layer-number-controllable graphene prepared by the method.

10 Claims, 1 Drawing Sheet

Biomass

Mild conditions

Chemical graphitization

Graphene

(51) Int. Cl.
B82Y 40/00 (2011.01)
C01B 32/196 (2017.01)

(52) U.S. Cl.
CPC ........... *B82Y 40/00* (2013.01); *C01B 2204/04* (2013.01); *C01B 2204/32* (2013.01); *C01P 2002/78* (2013.01); *C01P 2002/82* (2013.01); *C01P 2002/85* (2013.01)

(58) Field of Classification Search
CPC ............ C01B 2204/02; C01B 2204/22; C01B 32/182; C01B 32/186; C01B 32/188; C01B 32/19; C01B 32/192; C01B 32/198; C01B 2204/00; C01B 2204/06; C01B 2204/065; C01B 2204/20; C01B 2204/24; C01B 2204/26; C01B 2204/28; C01B 2204/30; C01B 32/20; C01B 32/205; C01B 32/21; C01B 32/215; C01B 32/22; C01B 32/225; C01B 32/23; B82Y 30/00; B82Y 40/00; C01P 2002/78; C01P 2002/82; C01P 2002/85; Y02E 60/13
See application file for complete search history.

(56) References Cited

OTHER PUBLICATIONS

Prekodravac, et al., A comprehensive review on selected graphene synthesis methods: from electrochemical exfoliation through rapid thermal annealing towards biomass pyrolysis, J. Mater. Chem. C. 2021; 9: 6722-6748 (Year: 2021).*

* cited by examiner

LAYER-NUMBER-CONTROLLABLE GRAPHENE DERIVED FROM NATURAL BIOMASS AND PREPARATION METHOD THEREOF

This application claims priority of Chinese Application No. 2022104949903, filed May 7, 2022, which is hereby incorporated by reference.

FIELD OF TECHNOLOGY

The present invention belongs to the technical field of graphene materials, and specifically relates to a layer-number-controllable graphene derived from natural biomass and a preparation method thereof.

BACKGROUND TECHNOLOGY

Nowadays, with the challenge of rapid increase of carbon dioxide emissions, strategies including carbon fixation and carbon neutralization have become an important direction in research and development of technologies in the field of material chemistry. Graphene is a two-dimensional carbon nanomaterial, which has already been used in the fields of energy, semiconductors, catalysis and medical treatment due to high electron mobility, high thermal conductivity and excellent permeability. However, as large-scale preparation of the graphene with low energy consumption is still a challenge, application of the graphene is greatly limited. Therefore, it is urgent to develop a mild technology for large-scale preparation of the graphene.

At present, most preparation methods of the graphene include physical and chemical stripping methods of graphite or carbon-rich substances. According to a Chinese patent with a patent number of CN 102431999A, a method for preparing high-quality graphene by using a graphite intercalation compound as a raw material with halogen or a metal halide as an intercalating agent, conducting expansion with an oxalic acid or hydrogen peroxide solution, and then conducting ultrasonic stripping in a solvent is disclosed. After graphite is subjected to intercalation, a powder of the graphite intercalation compound is added to the oxalic acid or hydrogen peroxide solution for expansion treatment to obtain a highly expanded vermicular graphene aggregate. Then, the vermicular graphene aggregate is subjected to ultrasonic vibration treatment for stripping in an organic solvent such as alcohols and ketones or a surfactant aqueous solution to obtain a graphene dispersion.

According to a Chinese patent with a patent number of CN 102431999A, a preparation method of graphene is disclosed. The preparation method comprises: (1) adding a tubular or sheet carbon raw material to concentrated sulfuric acid, followed by uniform stirring in an ice bath, and then adding a potassium permanganate powder, followed by stirring at a system temperature of 20-30° C. for 0.5-5 hours to obtain a reaction solution; (2) conducting shear dispersion treatment or ultrasonic treatment on the reaction solution to obtain a pre-stripped reaction solution; (3) slowly adding deionized water to the pre-stripped reaction solution for dilution without stirring, followed by filtration, and then washing a solid obtained after the filtration with hydrochloric acid, followed by filtration and drying to obtain a black solid; (4) conducting blasting treatment on the black solid at a high temperature of 300-1,200° C. to obtain crude graphene; and (5) conducting high temperature graphitization treatment on the crude graphene to obtain purified graphene.

However, the graphite and other carbon sources disclosed in the above patents need to be subjected to graphitization pretreatment at a high temperature, and the temperature of a graphitization furnace needs to be greater than 1,800° C. and be maintained for about 5 hours. In this process, energy consumption is extremely high, so that requirements for sustainable development of carbon neutrality and carbon peak cannot be met.

In addition, preparation of the graphene also depends on harsh conditions such as high temperature, high pressure and high vacuum. For example, a chemical vapor deposition method (CVD), a silicon carbide epitaxial growth method, a Joule thermal flash method, and an electrochemical dehydrogenation method are used. These methods have high requirements on equipment, high price and low yield. The price of each gram of graphene produced is greater than 500 yuan, so that the requirement for cost control in large-scale application cannot be met. In view of this situation, the expansion of graphene production precursors and the development of low-cost and mild preparation technologies are problems to be solved urgently at present.

SUMMARY OF THE INVENTION

The present invention provides a layer-number-controllable graphene derived from natural biomass and a preparation method thereof. According to the preparation method, the layer-number-controllable graphene is prepared by a mild chemical strategy at relatively low temperature with the biomass having high selectivity as a carbon source.

A preparation method of layer-number-controllable graphene derived from natural biomass comprises:

(1) pulverizing 1-100 g of biomass to obtain a 50-to 300-mesh biomass scrap, and drying the biomass scrap at 60-100° C. to obtain a biomass precursor;

(2) mixing the biomass precursor with a Bronsted acid solution in a solid-liquid ratio of 0.1:10 to 2:100 g/mL, conducting sealing after discharging oxygen and introducing nitrogen, and then conducting heating for a reaction at 75-95° C. for 1-6 hours to obtain a graphene suspension; and (3) conducting post-treatment on the graphene suspension to obtain a stable graphene dispersion, and then drying the stable graphene dispersion to obtain a graphene powder, where the post-treatment includes one or more of filtration washing, dialysis, or ultrasonic treatment.

Hydrogen ions and hydronium ions obtained by ionization of a Bronsted acid in water are used for catalyzing a continuous graphitization reaction of the biomass at low temperature. Under the attack of the Bronsted acid solution, oxygen atoms of glucopyranose and other major components in the biomass are removed, and molecular rings of the glucopyranose are opened, and then re-aromatized to form benzene ring structures, which are mutually connected and grow to obtain a graphene structure. These chemical reactions occur at the nanoscale in an autocatalytic process, so that the graphene suspension can be obtained by conversion at relatively low temperature.

In step (1), the biomass is straw, bamboo, poplar, pine, weeping cypress or thatch.

A pulverizing tool used in the pulverizing process comprises one or more of a crusher, a wood stripper, a ball mill and a cell pulverizer.

In step (2), the Bronsted acid solution comprises one or more of phosphoric acid, nitric acid, sulfuric acid, hydrosulfuric acid and perchloric acid, and has a concentration of 32-98%.

When the sealing is conducted after oxygen is discharged and nitrogen is introduced, heat preservation is conducted at room temperature for 0.5-4 hours to release an organic acid in the biomass precursor, and the organic acid includes one or more of tartaric acid, oxalic acid, malic acid, citric acid, ascorbic acid, benzoic acid, salicylic acid and caffeic acid, and has a concentration of 0.5-5 wt %. Under the combined action and attack of the organic acid and the Bronsted acid solution, oxygen atoms of the biomass precursor are removed, and molecular rings of glucopyranose are opened, so that the graphene suspension can be obtained by conversion at relatively low temperature.

In step (3), the stable graphene dispersion has a concentration of 0.1-5 wt %.

The drying is conducted at a temperature of 60-100° C. or −50° C. to −30° C. Further, the drying is conducted in an ordinary oven at 60-100° C., or in a vacuum oven at 60-100° C.

According to the present invention, the biomass from natural resources, such trees, leaves, straw and grass, is used as a low-cost carbon source. A hydrogen bond network of the biomass is destroyed and dissociated into the nanoscale by a process for catalysis with hydrogen ions (produced by ionization of a Bronsted acid) below 100° C. without any pretreatment, and then glucopyranose rings and the like are dehydrated and carbonized on a nanoscale surface with greatly increased specific surface area, re-aromatized and finally self-assembled to obtain a layer-number-controllable graphene material derived from natural biomass. Compared with other graphene preparation methods, a carbon-rich precursor is not required to be used, so that pretreatment in a graphitization furnace at ultra-high temperature is avoided, the energy consumption for samples per unit weight is significantly reduced, and requirements for sustainable development of carbon neutrality and carbon peak are met. The cost of preparing the graphene from the natural biomass is significantly reduced, and the added value of a biomass waste is greatly increased, so that the waste is turned into treasure. According to the chemical process for catalysis with hydrogen ions, a new reaction path for the preparation of the graphene is opened, and the development goal of green chemistry is satisfied, so that the chemical process is an ideal preparation method of graphene.

According to a layer-number-controllable graphene prepared by the preparation method of layer-number-controllable graphene derived from natural biomass, in the layer-number-controllable graphene, the diameter of nanosheet layers is 200-2,000 nm, the layer number of the nanosheet layers is 1-10, the thickness of the nanosheet layers is 0.35-5 nm, and the layer spacing of the nanosheet layers is 0.38-0.5 nm.

Compared with the prior art, the present invention has the following excellent effects.

(1) The process technology involved in the present disclosure has sufficient industrialization basis, and a natural biomass material which is sustainable and low in cost is used as a source material, so that the limitation that precursors for preparation of graphene depend on graphite and carbon-rich materials is avoided, the production equipment is simple and scalable, and the process is suitable for large-scale production.

(2) The layer-number-controllable graphene prepared by the present invention has large size and high quality, a reducing agent for removing oxygen-containing groups is not required, and the graphene prepared by a one-step method has extremely low content of oxygen-containing groups and good electrical conductivity, so that the technical bottleneck of preparation of graphene having high electrical conductivity in multiple steps is broken through.

(3) According to the process technology of the present invention, the temperature of a graphitization reaction in a traditional technology is greatly reduced from 1,800° C. or above to about 100° C. The preparation process is relatively mild, and the energy consumption for production of the graphene per unit weight is reduced by about 90%, so that the process is in line with the industrial development trend of carbon neutrality and carbon peak.

BRIEF DESCRIPTION OF THE DRAWINGS

FIGS. 1(a) and 1(b) are a schematic diagram showing a layer-number-controllable graphene derived from natural biomass and a preparation method thereof provided by a specific embodiment.

FIGS. 2(a) and 2(b) show a Raman spectrogram and an X-ray photoelectron spectroscopy C 1 s peak differentiation diagram of a layer-number-controllable graphene prepared in Example 2.

DESCRIPTION OF THE EMBODIMENTS

Figure 3A:
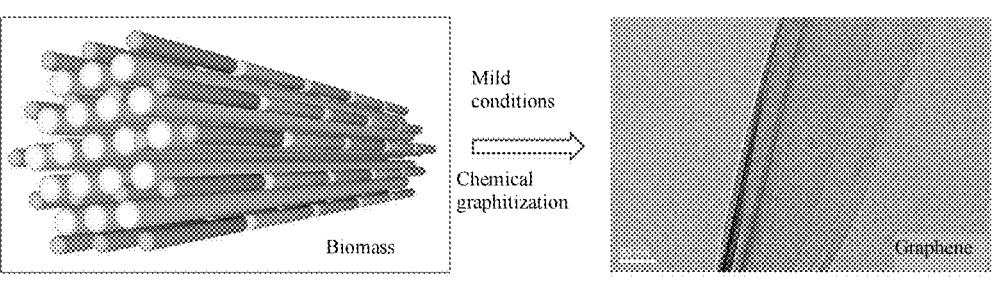
FIGS. 3(a), 3(b) and 3(c) show a digital photo and electrochemical impedance spectrograms of a graphene suspension prepared in Example 6.

In order to make persons in the technical field better understand solutions of the present invention, the technical solutions in embodiments of the present invention are clearly and completely described below in combination with drawings attached to the embodiments of the present invention. Obviously, the embodiments described are merely a part, rather than all of the embodiments of the present invention. Based on the embodiments of the present invention, all other embodiments acquired by persons of ordinary skill in the field without creative effort shall fall within the protection scope of the present invention.

The present invention is further explained below in combination with specific embodiments.

Example 1

1) 1 g of wheat straw was placed in a crusher for pulverizing to obtain a 50-mesh wheat straw scrap, and the wheat straw scrap was placed in an oven for drying at 60° C. for 2 hours to obtain a dried wheat straw scrap precursor.

2) The wheat straw scrap precursor was mixed with a 40% phosphoric acid solution in a solid-liquid ratio of 0.1 g:10 mL, sealing was conducted after oxygen was discharged and nitrogen was introduced, followed by soaking at room temperature for 1 hour to release oxalic acid in the wheat straw scrap precursor, and then heating was conducted for a reaction at 90° C. for 3 hours to obtain about 0.5 wt % of a graphene suspension after conversion.

3) Filtration washing and ultrasonic treatment were conducted to obtain a stable graphene dispersion, and then drying was conducted in a vacuum oven at 80° C. to obtain a graphene powder, where in the graphene powder, the diameter of nanosheet layers was 2,000 nm, the layer number of the nanosheet layers was 5, the corresponding thickness of the nanosheet layers was about 2.8 nm, and the layer spacing of the nanosheet layers was about 0.5 nm.

Example 2

1) 10 g of poplar was stripped into sawdust by a wood stripper and then pulverized by a crusher to obtain a 100-mesh poplar sawdust, and the poplar sawdust was placed in an oven for drying at 80° C. for 1 hour to obtain a dried poplar sawdust precursor.
2) The poplar sawdust precursor was mixed with a 64% sulfuric acid solution in a solid-liquid ratio of 0.1 g:100 mL, sealing was conducted after oxygen was discharged and nitrogen was introduced, followed by soaking at room temperature for 1 hour to release salicylic acid in the poplar sawdust, and then heating was conducted for a reaction at 95° C. for 4 hours to obtain about 0.5 wt % of a graphene suspension after conversion.
3) Filtration washing and dialysis were conducted to obtain a stable graphene dispersion, and then freeze-drying was conducted at –52° C. to obtain a graphene powder, where in the graphene powder, the diameter of a nanosheet layer was 1,600 nm, the number of the nanosheet layer was 1, the corresponding thickness of the nanosheet layer was about 0.35 nm, and the one-layer nanosheet layer had no layer spacing.

Example 3

1) 50 g of bamboo was ground by a ball mill to obtain a 300-mesh bamboo powder, and the bamboo powder was placed in an oven for drying at 90° C. for 2 hours to obtain a dried bamboo powder precursor.
2) The bamboo powder precursor was mixed with a 64% sulfuric acid solution in a solid-liquid ratio of 2 g:100 mL, sealing was conducted after oxygen was discharged and nitrogen was introduced, followed by soaking at room temperature for 1 hour to release benzoic acid in the bamboo powder precursor, and then heating was conducted for a reaction at 90° C. for 6 hours to obtain about 2 wt % of a graphene suspension after conversion.
3) Filtration washing and ultrasonic treatment were conducted to obtain a stable graphene dispersion, and then drying was conducted in an ordinary oven at 80° C. to obtain a graphene powder, where in the graphene powder, the diameter of nanosheet layers was 1,000 nm, the layer number of the nanosheet layers was 3, the corresponding thickness of the nanosheet layers was about 1.3 nm, and the layer spacing of the nanosheet layers was about 0.39 nm.

Example 4

1) 20 g of thatch was pulverized by a pulverizer to obtain a 200-mesh thatch powder, and the thatch powder was placed in an oven for drying at 70° C. for 4 hours to obtain a dried thatch powder precursor.
2) The thatch powder precursor was mixed with a 42% sulfuric acid solution in a solid-liquid ratio of 10 g:80 mL, sealing was conducted after oxygen was discharged and nitrogen was introduced, followed by soaking at room temperature for 2 hours to release oxalic acid and benzoic acid in the thatch powder precursor, and then heating was conducted for a reaction at 85° C. for 2 hours to obtain about 5 wt % of a graphene suspension after conversion.
3) Dialysis and ultrasonic treatment were conducted to obtain a stable graphene dispersion, and then drying was conducted in a vacuum oven at 80° C. to obtain a graphene powder, where in the graphene powder, the diameter of nanosheet layers was 600 nm, the layer number of the nanosheet layers was 2, the corresponding thickness of the nanosheet layers was about 0.8 nm, and the layer spacing of the nanosheet layers was about 0.4 nm.

Example 5

1) 20 g of pine was stripped into sawdust by a wood stripper and then pulverized by a crusher to obtain an 80-mesh pine sawdust, and the pine sawdust was placed in an oven for drying at 95° C. for 3 hours to obtain a dried pine sawdust precursor.
2) The pine sawdust precursor was mixed with a mixed acid solution of 40% phosphoric acid and 20% sulfuric acid in a solid-liquid ratio of 1 g:60 mL, sealing was conducted after oxygen was discharged and nitrogen was introduced, followed by soaking at room temperature for 1 hour to release benzoic acid and salicylic acid in the pine sawdust precursor, and then heating was conducted for a reaction at 90° C. for 6 hours to obtain about 2 wt % of a graphene suspension after conversion.
3) Filtration washing, ultrasonic treatment and dialysis were conducted to obtain a stable graphene dispersion, and then drying was conducted in a vacuum oven at 90° C. to obtain a graphene powder, where in the graphene powder, the diameter of nanosheet layers was 500 nm, the layer number of the nanosheet layers was 4, the corresponding thickness of the nanosheet layers was about 4.2 nm, and the layer spacing of the nanosheet layers was about 0.38 nm.

Example 6

1) 30 g of weeping cypress was stripped into sawdust by a wood stripper and then pulverized by a crusher to obtain a 150-mesh weeping cypress sawdust, and the weeping cypress sawdust was placed in an oven for drying at 85° C. for 4 hours to obtain a dried weeping cypress sawdust precursor.
2) The weeping cypress sawdust precursor was mixed with a mixed acid solution of 32% sulfuric acid and 20% perchloric acid in a solid-liquid ratio of 0.2 g:50 mL, sealing was conducted after oxygen was discharged and nitrogen was introduced, followed by soaking at room temperature for 1 hour to release tartric acid and citric acid in the weeping cypress sawdust, and then heating was conducted for a reaction at 95° C. for 5 hours to obtain about 0.5 wt % of a graphene suspension after conversion.
3) Filtration washing and dialysis were conducted to obtain a stable graphene dispersion, and then drying was conducted in a vacuum oven at 80° C. to obtain a graphene powder, where in the graphene powder, the diameter of nanosheet layers was 300 nm, the layer number of the nanosheet layers was 10, the corresponding thickness of the nanosheet layers was about 5 nm, and the layer spacing of the nanosheet layers was about 0.42 nm.

Performance Test:

The layer number, sp$^2$ carbon mass and electrical conductivity of the biomass-derived graphene prepared in Example 1, Example 2, Example 3, Example 4, Example 5 and Example 6 were measured in a field-emission transmission electron microscope system, a laser Raman confocal system, an X-ray photoelectron spectroscopy system and an electrochemical testing system.

Results are as shown in FIG. 1, which is a flow diagram of a layer-number-controllable graphene derived from biomass prepared in Example 3. FIG. 1(*a*) is a schematic diagram of the biomass, and FIG. 1(*b*) is a transmission electron microscope image. The transmission image shows that the layer number of the graphene prepared is 3.

Results are as shown in FIG. 2, which shows a Raman spectrogram and an X-ray photoelectron spectroscopy diagram of a layer-number-controllable graphene derived from biomass prepared in Example 2. As shown in FIG. 2(*a*), the ID/IG ratio of the graphene is about 1. As shown in FIG. 2(*b*), the sp$^2$ carbon content reaches 71.16%.

Figure 3B:
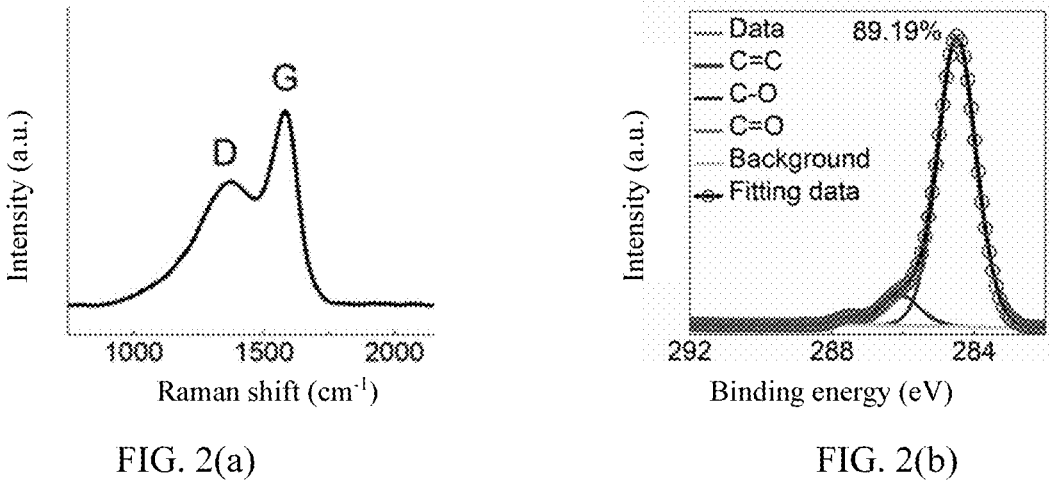
Figure 3C:
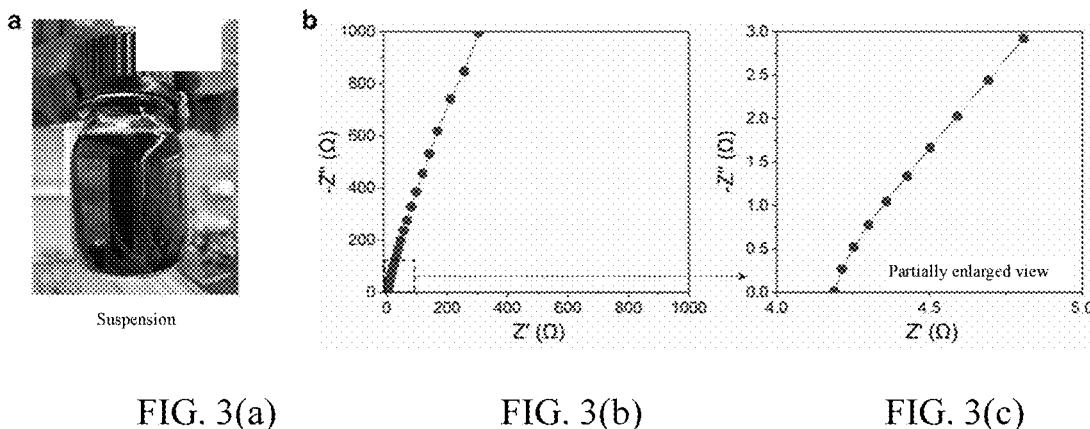

Results are as shown in FIG. 3, which shows a digital photo and electrochemical impedance spectrograms of a suspension having excellent dispersion of a layer-number-controllable graphene derived from biomass prepared in Example 6. FIG. 3(*a*) shows the graphene suspension prepared. As shown in FIGS. 3(*b*) and 3(*c*), the graphene has good suspension stability and an electrical conductivity of up to 4 S/cm.

According to the transmission electron microscope image, spectral data and electrochemical data (as shown in FIG. 1, FIG. 2 and FIG. 3 attached to the specification), it can be seen that the biomass-derived graphene of the present invention has the characteristics of controllable layer number, high quality and good electrical conductivity, and the energy consumption can be reduced by more than 90% by using the mild preparation method.

The examples listed above are merely specific embodiments of the present invention. The present invention is not limited to the above embodiments, and may have many variations. All variations which can be directly derived from or associated with the disclosed contents of the present invention by persons of ordinary skill in the field shall be considered as falling within the protection scope of the present invention.

What is claimed is:

1. A preparation method of layer-number-controllable graphene derived from natural biomass, comprising:
   (1) pulverizing 1-100 g of biomass to obtain a 50-to 300-mesh biomass scrap, and drying the biomass scrap at 60-100° C. to obtain a biomass precursor;
   (2) mixing the biomass precursor with a Bronsted acid solution in a solid-liquid ratio of 0.1:10 to 2:100 g/mL, conducting sealing after discharging oxygen and introducing nitrogen, and then conducting heating for a reaction at 75-95° C. for 1-6 hours to obtain a graphene suspension; and
   (3) conducting post-treatment on the graphene suspension to obtain a stable graphene dispersion, and then drying the stable graphene dispersion to obtain a graphene powder, wherein the post-treatment comprises one or more of filtration washing, dialysis or ultrasonic treatment.

2. The preparation method of layer-number-controllable graphene derived from natural biomass according to claim 1, wherein in step (1), the biomass is straw, bamboo, poplar, pine, weeping cypress or thatch.

3. The preparation method of layer-number-controllable graphene derived from natural biomass according to claim 1, wherein in step (2), the Bronsted acid solution comprises one or more of phosphoric acid, nitric acid, sulfuric acid, hydrosulfuric acid and perchloric acid, and has a concentration of 32%-98%.

4. The preparation method of layer-number-controllable graphene derived from natural biomass according to claim 1, wherein in step (2), when the sealing is conducted after oxygen is discharged and nitrogen is introduced, heat preservation is conducted at room temperature for 0.5-4 hours to release an organic acid in the biomass precursor.

5. The preparation method of layer-number-controllable graphene derived from natural biomass according to claim 4, wherein the organic acid comprises one or more of tartaric acid, oxalic acid, malic acid, citric acid, ascorbic acid, benzoic acid, salicylic acid and caffeic acid, and has a concentration of 0.5-5 wt %.

6. The preparation method of layer-number-controllable graphene derived from natural biomass according to claim 1, wherein in step (3), the stable graphene dispersion has a concentration of 0.1-5 wt %.

7. The preparation method of layer-number-controllable graphene derived from natural biomass according to claim 1, wherein in step (3), the drying is conducted at a temperature of 60-100° C. or −50° C. to −30° C.

8. The preparation method of layer-number-controllable graphene derived from natural biomass according to claim 1- or 6, wherein in step (3), a drying method comprises drying in an ordinary oven at 60-100° C., drying in a vacuum oven at 60-100° C., or freeze-drying at −50° C. to −30° C.

9. A layer-number-controllable graphene prepared by the preparation method of layer-number-controllable graphene derived from natural biomass according to claim 1, wherein in the layer-number-controllable graphene, the diameter of nanosheet layers is 200-2,000 nm, the layer number of the nanosheet layers is 1-10, the thickness of the nanosheet layers is 0.35-5 nm, and the spacing of the nanosheet layers is 0.38-0.5 nm.

10. The preparation method of layer-number-controllable graphene derived from natural biomass according to claim 6, wherein in step (3), a drying method comprises drying in an ordinary oven at 60-100° C., drying in a vacuum oven at 60-100° C., or freeze-drying at −50° C. to −30° C.

\* \* \* \* \*